(12) United States Patent
Margosian (10) Patent No.: US 11,628,734 B2
(45) Date of Patent: Apr. 18, 2023

(54) ENHANCED VEHICLE CONNECTION

(71) Applicant: Argo AI, LLC, Pittsburgh, PA (US)

(72) Inventor: Brian T. Margosian, Lathrup Village, MI (US)

(73) Assignee: ARGO AI, LLC, Pittsburgh, PA (US)

(*) Notice: Subject to any disclaimer, the term of this patent is extended or adjusted under 35 U.S.C. 154(b) by 326 days.

(21) Appl. No.: 17/028,895

(22) Filed: Sep. 22, 2020

(65) Prior Publication Data
US 2022/0089052 A1    Mar. 24, 2022

(51) Int. Cl.
| | |
|---|---|
| *B60L 53/16* | (2019.01) |
| *B60L 53/30* | (2019.01) |
| *B60L 53/62* | (2019.01) |
| *B60L 53/63* | (2019.01) |
| *B60L 53/66* | (2019.01) |

(52) U.S. Cl.
CPC .............. *B60L 53/16* (2019.02); *B60L 53/30* (2019.02); *B60L 53/62* (2019.02); *B60L 53/63* (2019.02); *B60L 53/66* (2019.02)

(58) Field of Classification Search
CPC ....................................................... B60L 53/16
USPC ......................................................... 320/109
See application file for complete search history.

(56) References Cited

U.S. PATENT DOCUMENTS

| | | | |
|---|---|---|---|
| 9,260,024 B1 * | 2/2016 | Lau ........................ | B60L 53/66 |
| 2006/0083265 A1 | 4/2006 | Jordan et al. | |
| 2008/0186870 A1 | 8/2008 | Butts et al. | |

(Continued)

FOREIGN PATENT DOCUMENTS

| | | |
|---|---|---|
| CN | 207503686 U | 6/2018 |
| CN | 108650313 A | 10/2018 |

(Continued)

OTHER PUBLICATIONS

Li et al. "A Survey of Switched Ethernet Solutions for Real-time Audio/Video Communications", Building Wireless Sensor Networks, 2017, pp. 1-30, Elsevier, United States.

(Continued)

*Primary Examiner* — Jerry D Robbins
(74) *Attorney, Agent, or Firm* — Sterne, Kessler, Goldstein & Fox P.L.L.C.

(57) ABSTRACT

A kind of electromagnetic vehicle pulse effects various dimensions remote online monitoring system of the present invention belongs to technical field of electromagnetic compatibility measurement, its structure has CAN bus to diagnose subsystem (1), audio-video monitoring subsystem (2), induced voltage measurement subsystem (3), fiber distribution network (4) and remote control subsystem (5), wherein, remote control subsystem 5 is connected respectively to CAN bus by fiber distribution network (4) and diagnoses subsystem (1), audio-video monitoring subsystem (2) and induced voltage measurement subsystem (3). The present invention is used based on CAN bus diagnosis, the combination monitoring scheme of audio-video monitoring and induced voltage measurement and based on the passive optical network transmission plan of point-to-multipoint topological structure, the various dimensions remote online monitoring for realizing tested vehicle coupling response during electromagnetic pulse effect is tested, has many advantages, such as that anti-strong electromagnetic, at low cost, autgmentability is strong.

20 Claims, 7 Drawing Sheets

(56) References Cited

U.S. PATENT DOCUMENTS

| | | |
|---|---|---|
| 2012/0189302 A1 | 7/2012 | Yuki et al. |
| 2014/0032800 A1 | 1/2014 | Peirce et al. |
| 2014/0273856 A1* | 9/2014 | Kyles .................... H04W 76/28 |
| | | 455/41.2 |
| 2016/0347191 A1 | 12/2016 | Hayashigawa et al. |
| 2018/0062420 A1* | 3/2018 | Isaac ..................... H01F 27/363 |
| 2018/0123360 A1 | 5/2018 | Eaves |
| 2018/0201142 A1* | 7/2018 | Galin ..................... B60L 55/00 |
| 2018/0295011 A1 | 10/2018 | Wang et al. |
| 2019/0098090 A1 | 3/2019 | Binder et al. |
| 2019/0215072 A1 | 7/2019 | Truong et al. |
| 2019/0217730 A1 | 7/2019 | Gotz et al. |

FOREIGN PATENT DOCUMENTS

| | | |
|---|---|---|
| CN | 108702557 A | 10/2018 |
| JP | 2020-061923 A | 4/2020 |
| WO | 2019116054 A1 | 6/2019 |

OTHER PUBLICATIONS

Wunsche, Thomas, "Can and Optical Distances", CiA CAN Newsletter, 2006, Germany.

International Search Report and Written Opinion of the International Searching Authority directed to related International Patent Application No. PCT/US2021/051344, dated Jan. 10, 2022; 7 pages.

\* cited by examiner

ENHANCED VEHICLE CONNECTION

TECHNICAL FIELD

This disclosure generally relates to systems and methods for an enhanced vehicle connection.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle. Data collected by the sensor system may need to be offloaded at the end of the day. In addition, software updates and data uploading may be needed in order to keep the vehicle's computing system and the sensor system up-to-date on the latest software upgrades and/or other needs. Further, the vehicles may require their batteries to be recharged over a period of time to restore it to a capacity that allows it to function when the vehicle is back on the road. Both of these mechanisms are necessary for the proper functioning of the vehicle. However, state and federal regulations may dictate how long a vehicle may run in an idle state. Therefore there is a need to supply vehicles with the data transfer and the battery charging needed at the end of the day simultaneously in order to minimize the need for idling the vehicle.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Autonomous vehicles may include plug-in hybrid vehicles or purely electric vehicles. These vehicles may comprise one or more sensors that are essential to the performance of the vehicle while it is operating in the real world. These one or more sensors may include LIDAR sensors, stereo cameras, radar sensors, thermal sensors, or other sensors attached to an autonomous vehicle. Such vehicles require electrical connectors for recharging the high-voltage computing system and batteries. These connectors may be standardized by the society of automotive engineers (SAE) standard (e.g., SAEJ1772). Such standardization dictates that a connector may have several pins in a standardized form so that autonomous vehicles that are compliant with the SAE standard are capable of accepting such connectors to charge their batteries. Depending on the configuration of the connectors, there may be three or five pins that may carry AC and/or DC power. In addition to charging an autonomous vehicle, there is a need to initiate large data transfers (e.g., loading and/or offloading large amounts of data). In order to perform these large data transfers, the vehicle may be required to need to idle in order to continue to power the vehicle's computing system because battery power alone may not be sufficient. However, idling the vehicle for extended periods of time, even in minutes, may violate state or federal regulations.

Currently, solutions for the above problem may be limited to short data transfers while idling the vehicle and having to repeat that process multiple times. Therefore, there is a need to allow both large data transfers and charging the vehicle's batteries.

Example embodiments described herein provide certain systems, methods, and devices for an enhanced vehicle connection.

Charging vehicles such as hybrid and electric vehicles typically use an SAE approved power plug for charging the batteries of these vehicles. For example, a SAEJ1772 connector is an example of that power plug. In order to communicate between the onboard vehicle charging system and the off-board charging station, there is a control area network (CAN) link between the two to negotiate one or more parameters, such as charging current, voltage, electric power mode, etc.

With autonomous vehicles, there is a need to move a large amount of data on or off the vehicle when the vehicle is parked. For example, data such as logged camera data, logged events, captured telemetry at the end of the shift, software updates, or other types of data.

Currently, vehicles may use an Ethernet connection over copper in a separate connector than the power connector to plug into the vehicle to perform the data transfer. For example, such applications may use 10GBASE-T, which is an Ethernet standard that facilitates the transmission of data at 10 Megabits per second (Mbps) over twisted wire pairs. However, with that type of solution, a complication exists because a portion of the vehicle must be run to supply power to the computing system of the vehicle while the data is being offloaded and/or on-loaded since the computing system can draw a large amount of power. Often that means idling the car. However, there are some constraints and legalities for idling a car for a certain amount of time. For example, some states do not allow idling a car due to some regulations.

In one or more embodiments, an enhanced vehicle connection system may facilitate integrating a fiber optic link with one or more power connectors. An enhanced vehicle connection system may facilitate that a computing system may continue to operate by the delivery of electricity by one or more power connectors while on-loading and/or offloading data to and from the vehicle at a high rate of speed. Using a fiber-optic link is scalable and allows for higher data bandwidths and rates. The higher bandwidth may depend on what a vehicle and its computing platform support in addition to what the other endpoint on the transfer station supports.

In one or more embodiments, an enhanced vehicle connection system may facilitate an operator to initiate a data transfer without the need to idle the vehicle. The SAE plug is strictly used for charging a vehicle from an external power delivery system. This may occur when the vehicle is stationary.

In one or more embodiments, an enhanced vehicle connection system may facilitate the use of a new interface capable of interface with a power plug and a fiber optic data plug to allow a simultaneous transfer of power and data with the vehicle.

In one or more embodiments, an enhanced vehicle connection system may facilitate the use of an SAE compatible plug that may have a circular form that may comprise three or more power contact pins. The three or more power contact pins may deliver electrical power to the vehicle in order to charge the batteries of the vehicle and operate its computing system. The three or more power contact pins may connect to an enhanced vehicle interface of the vehicle. The enhanced vehicle interface allows creating contact points between the one or more power contact pins and the power system of the vehicle in order to initiate a transfer of charging electricity to the vehicle systems and to the batteries of the vehicle.

In one or more embodiments, an enhanced vehicle connection system may facilitate the use of one or more optical links within the enhanced vehicle connector. The one or more optical links may be comprised of one or more data contact pins. The one or more optical links may connect to the enhanced vehicle interface. The enhanced vehicle interface may allow creating contact points between the one or more data contact pins and the data portion of the vehicle in order to initiate the data transfer to and from the vehicle's computing system without the need to idle the vehicle since the one or more power contact pins may be delivering power to the vehicle systems.

In one or more embodiments, an enhanced vehicle connection system may facilitate the use of collocated one or more data pins and one or more power contact pins with the same housing. In that manner, a smaller footprint may be used by the enhanced vehicle plug and the vehicle connector portion of the enhanced vehicle interface.

In one or more embodiments, an enhanced vehicle connection system may facilitate the use of two housings to accommodate the one or more data pins and the one or more power contact pins. In that case, the vehicle connector portion would be configured accepting the two housings simultaneously to interface with the enhanced vehicle interface in order to deliver both data and power to and from the vehicle.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
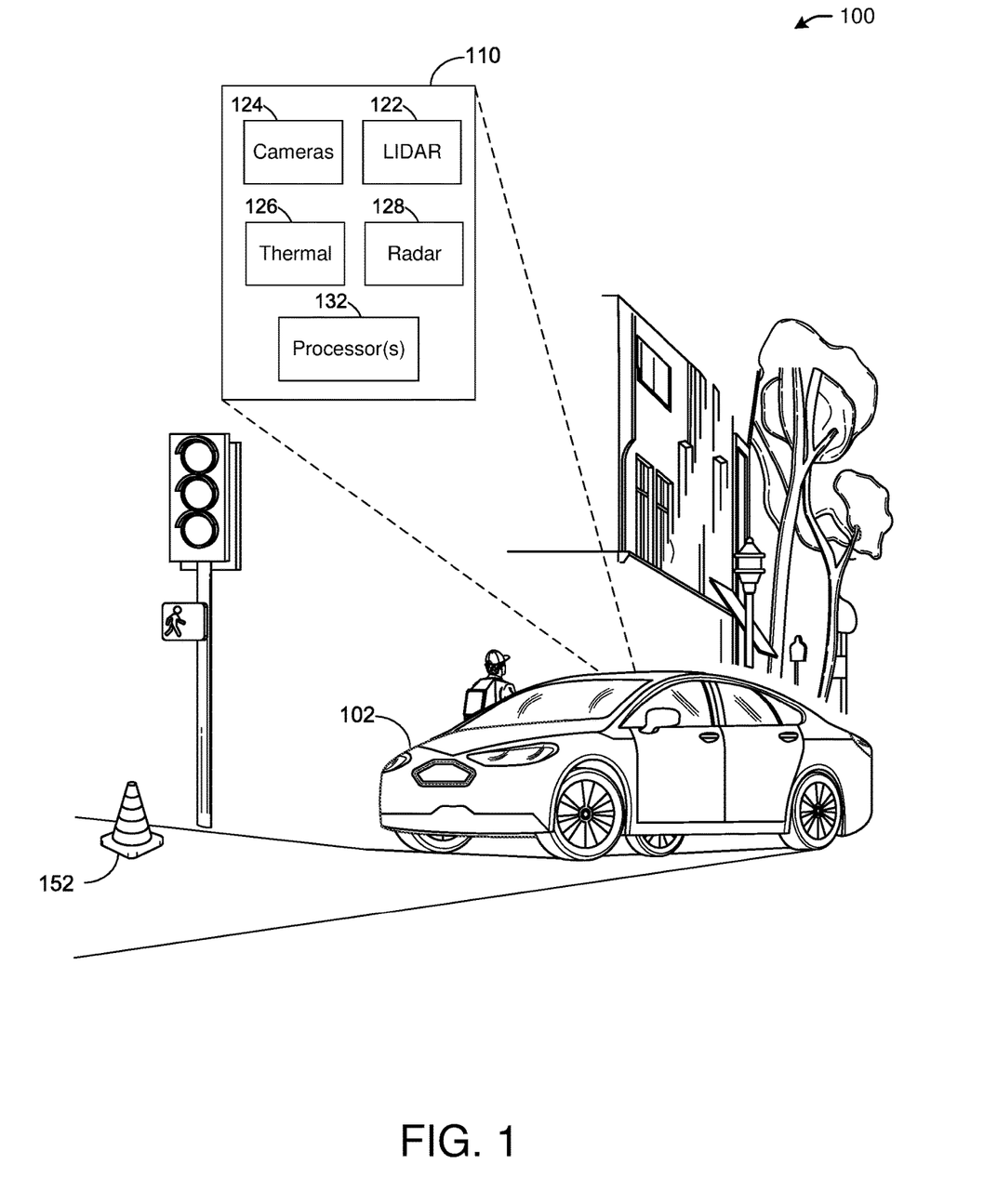
FIG. 1 illustrates an example environment of a vehicle, in accordance with one or more example embodiments of the present disclosure.

FIG. 1 illustrates example environment 100 of a vehicle 102, in accordance with one or more example embodiments of the present disclosure.

The modern automobile may have many electronic control units (ECUs) for various subsystems. Some of these subsystems may be used to provide proper operation of the vehicle. Some examples of these subsystems may include a braking subsystem, a cruise control subsystem, power windows subsystem, doors subsystem, battery charging subsystem for hybrid and electric vehicles, or other vehicle subsystems. Communication between the various subsystems is an important feature of operating vehicles. A controller area network (CAN) bus may be used to allow the subsystems to communicate with each other. Such communications provide a wide range of safety, economy, and convenience features to be implemented using software. For example, sensor inputs from the various sensors around the vehicle may be communicated between the various ECUs of the vehicle via the CAN bus to perform actions that may be essential to the performance of the vehicle. An example may include auto lane assist and/or avoidance systems where such sensor inputs are used by the CAN bus to communicate these inputs to the driver-assist system such as lane departure warning, which in some situations may actuate breaking active avoidance systems.

Referring to FIG. 1, there is shown a vehicle 102 having a sensor system 110 for a plurality of cameras, emitters, and sensors. The sensor system 110 may be connected to the vehicle 102 (e.g., on top of the vehicle 102, as shown). In this environment 100, there shown that sensor system 110 may detect objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124, such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processor(s) 132. The one or more processor(s) 132 may control the transmission and reception of signals using the LIDAR 122, the cameras 124, the thermal sensor 126, and the radar 128. The various sensors of the sensor system 110, when calibrated correctly, should indicate a proper distance and shape of object 152. However, the vehicle 102 may be subjected to environmental conditions such as vibration, thermal shock, or similar conditions. Under such conditions, the various sensors of the sensor system 110 may fall out of alignment. This would result in the data received from these various sensors to be unreliable when processed by processor(s) 132.

It is understood that the above descriptions are for purposes of illustration and are not meant to be limiting.

Figure 2:
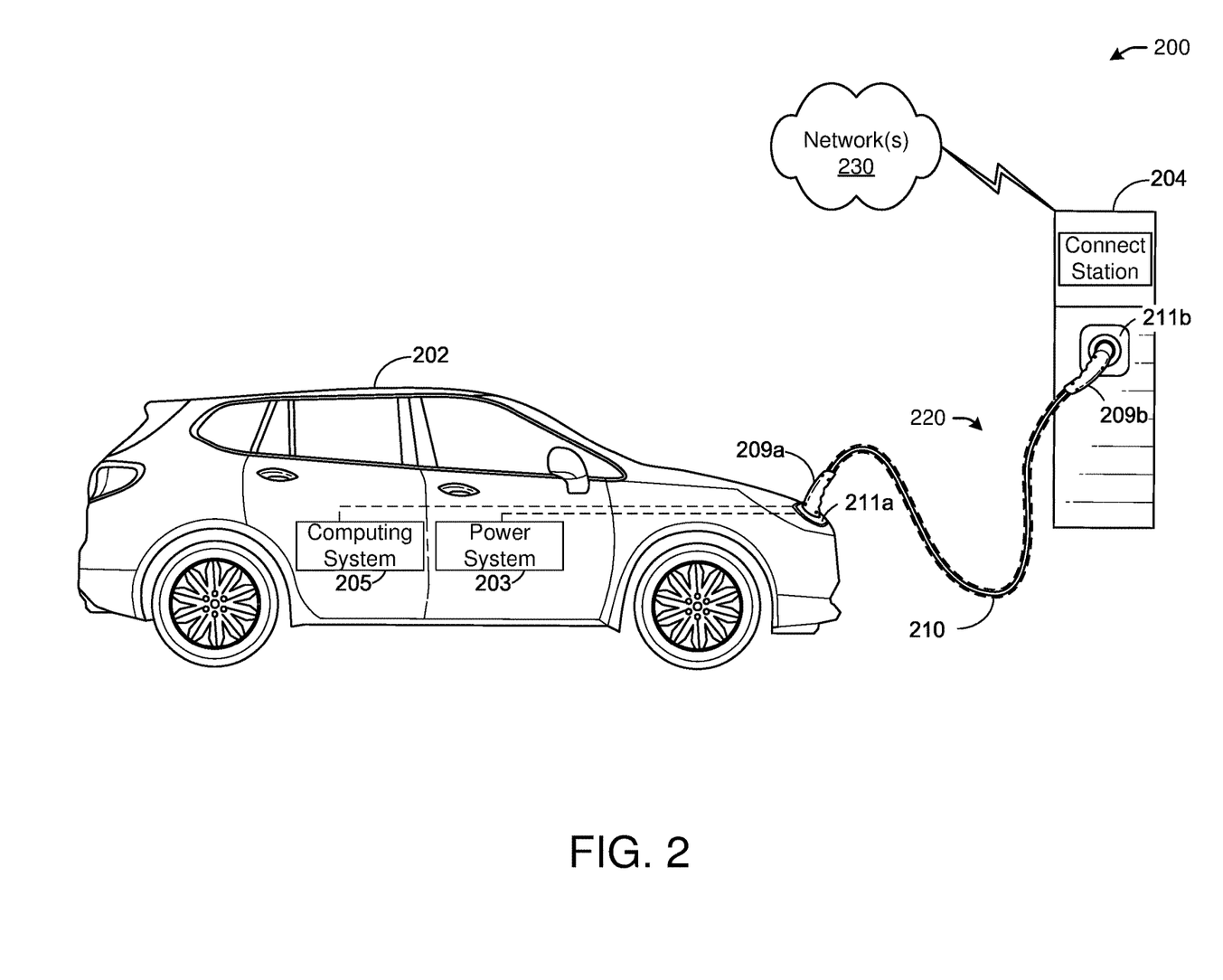
FIG. 2 depicts an illustrative schematic diagram for an enhanced vehicle connection, in accordance with one or more example embodiments of the present disclosure.

FIG. 2 depicts an illustrative schematic diagram 200 for enhanced vehicle connection, in accordance with one or more example embodiments of the present disclosure.

Referring to FIG. 2, there is shown a vehicle 202 may be parked or stationary. The vehicle 202 may include computing systems and power systems that may be essential to the operation of the vehicle 202. An example of this computing system may be computing system 205 and power systems 203, shown in FIG. 2. These systems may have various functions. For example, the computing system 205 may be integrated with a plurality of sensors that are used to detect objects in the vicinity of the vehicle 202, and collect the data to be processed instantaneously or at a later time. The computing system 205 may comprise one or more processors and one or more storage units. The power system 203 may be a system responsible for generating and/or storing power to be used by at least the computing systems of vehicle 202. Other systems within vehicle 202 may also rely on the power system 203 in order to be operational.

In one or more embodiments, an enhanced vehicle connection system may facilitate the use of an enhanced cabling system 220 that may be configured to deliver power and data to and from the vehicle 202. The enhanced cabling system 220 may be comprised of a cable 210, one or more plug assemblies 209a and 209b, and one or more enhanced interfaces (e.g., enhanced vehicle interface 211a and enhanced station interface 211b).

The cable 210 may comprise a first set of wires that deliver electric power from the station 204 to the vehicle 202. The cable 210 may comprise a second set of wires that may be used for data transfer between the station 204 and the vehicle 202. The cable 210 may be configured to provide shielding between the first set of wires and the second set of wires to minimize interference of data transfer while power is being delivered to the vehicle 202.

The one or more plug assemblies 209a and 209b may be comprised of a first set of contact pins associated with the first set of wires of cable 210 and a second set of contact pins associated with the second set of wires of cable 210. The one or more plug assemblies 209a and 209b may be formed of one or more contact pins housings. For example, a first contact pins housing may comprise the first set of contact pins, and the second set of contact pins such that these contact pins are collocated. Alternatively, a first contact pins housing may comprise the first set of contact pins and a second contact pins housing may comprise the second set of contact pins. Although FIG. 2 shows that plug assembly 209b is used to connect to the station 204, in some scenarios, cable 210 may be directly connected to the station 204 without the need for the plug assembly 209b.

The one or more enhanced interfaces (e.g., enhanced vehicle interface 211a and enhanced station interface 211b) may be interfaces that allowed the delivery of power and the transfer of data between the station 204 and the vehicle 202.

The station 204 may be a station capable of providing both electric power configured to charge the power system 203 of the vehicle 202 and data connections configured to provide access to the computing system 205 such that the computing system 205 and the station 204 may be able to perform data transfer. That is, vehicle 202 and station 204 may be able to move a large amount of data on or off the vehicle 202 when the vehicle 202 is parked. Some examples of data transfers may include transferring logged camera data, logged events, and captured telemetry at the end of the shift, software updates, or other types of data.

The station 204 may be configured to communicate with one or more communications network(s) 230 wirelessly or wired. The communications network(s) 230 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network(s) 230 may have any suitable communication range associated therewith and may include, for example, global networks, metropolitan area networks (MANs), wide area networks (WANs), local area networks (LANs), or personal area networks (PANs). In addition, the communications network(s) 230 may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, white space communication mediums, ultra-high frequency communication mediums, satellite communication mediums, or any combination thereof.

It is understood that the above descriptions are for purposes of illustration and are not meant to be limiting.

Figure 3A:
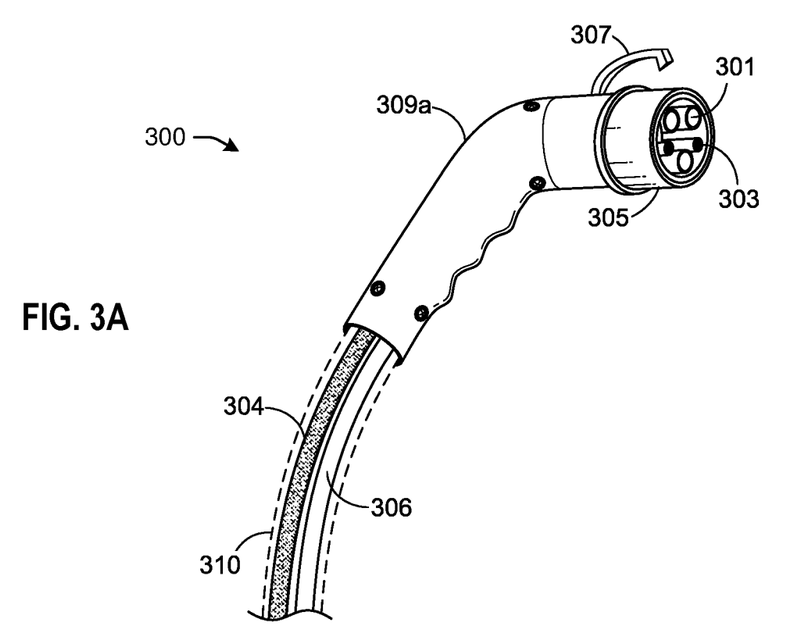
FIGS. 3A-3B depict illustrative schematic diagrams for enhanced vehicle connections, in accordance with one or more example embodiments of the present disclosure.
Figure 3B:
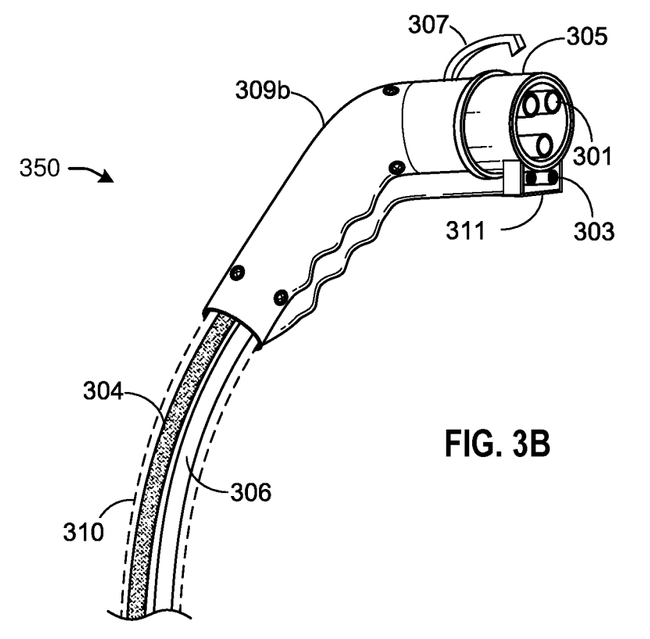

FIGS. 3A-3B depict illustrative schematic diagrams for enhanced vehicle connections, in accordance with one or more example embodiments of the present disclosure.

Referring to FIG. 3A, there is shown an enhanced vehicle connector 300. The enhanced vehicle connector may be comprised of plug assembly 309a that may be attached to cable 310. The plug assembly 309a may include a latch 307 that attaches the enhanced vehicle connector 300 to a receptacle/interface on the vehicle and/or on a station (e.g., station 204 of FIG. 2). The plug assembly 309a may comprise contact pins housing 305 that houses one or more sets of contact pins. In the example of FIG. 3A, there are shown two sets of contact pins. For example, a first set of contact pins may be comprised of three contact pins 301, and a second set of contact pins may be comprised of two contact pins 303. The first set of contact pins may be associated with cable subset 306 of cable 310. Cable subset 306 may be comprised of wires that supply electrical power to the vehicle. The second set of contact pins may be associated with cable subset 304 of cable 310. Cable subset 304 may be comprised of fiber-optic wires that allow data to be transferred to and from the vehicle. It should be understood that although the first set of contact pins is shown to be comprised of three power cables, another number of contact pins may be used to form the first set of contact pins depending on the implementation. Similarly, although the second set of contact pins is shown to comprise two fiber-optic cables, another number of contact pins may be used to form a second set of contact pins depending on the implementation.

Referring to FIG. 3B, there is shown an enhanced vehicle connector 350, which may be an alternate implementation of the enhanced vehicle connector 300 of FIG. 3A. The enhanced vehicle connector 350 may be comprised of plug assembly 309b that may be attached to cable 310. The plug assembly 309b may include a latch 307 that attaches the enhanced vehicle connector 350 to a receptacle/interface on the vehicle and/or on a station (e.g., station 204 of FIG. 2). The plug assembly 309b may comprise contact pins housing 305 that houses a first set of contact pins. In the example of FIG. 3B, there is shown one set of contact pins within the housing 305. For example, the first set of contact pins may be comprised of three contact pins 301. In the example of FIG. 3B, a second housing 311, may house a second set of contact pins. For example, the second set of contact pins may be comprised of two contact pins 303. The first set of contact pins may be associated with cable subset 306 of cable 310. Cable subset 306 may be comprised of wires that supply electrical power to the vehicle. The second set of contact pins may be associated with cable subset 304 of cable 310. Cable subset 304 may be comprised of fiber-optic wires that allow data to be transferred to and from the vehicle. It should be understood that although the first set of contact pins is shown to be comprised of three power cables, another number of contact pins may be used to form the first set of contact pins depending on the implementation. Similarly, although the second set of contact pins is shown to comprise two fiber-optic cables, another number of contact pins may be used to form a second set of contact pins depending on the implementation. Further, it should be understood that although housing 311 is shown to be below housing 305 and shown to be rectangular, it should be understood that housing 311 may be located at any side of the housing 305 or even may be detached from housing 305. Further, housing 311 may take the form of an oval, circular, square, rectangle, or any other shape in order to house the contact pins 303a and 303b.

It is understood that the above descriptions are for purposes of illustration and are not meant to be limiting.

Figure 4:
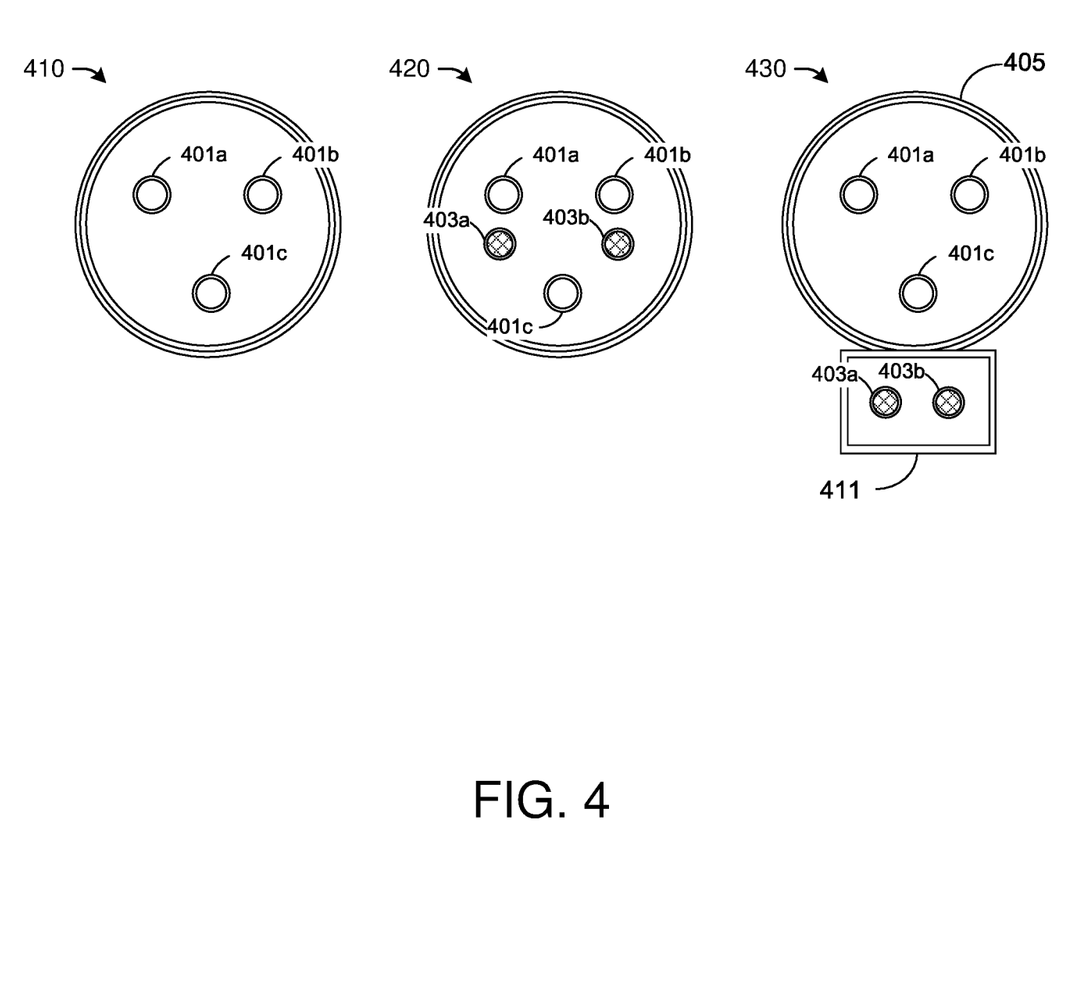
FIG. 4 depicts an illustrative schematic diagram for an enhanced vehicle connection, in accordance with one or more example embodiments of the present disclosure.

FIG. 4 depicts an illustrative schematic diagram for enhanced vehicle connection, in accordance with one or more example embodiments of the present disclosure.

Referring to FIG. 4, there is shown various embodiments of housing that may comprise the one or more wire of an enhanced vehicle connection. For example, there is shown housing 410, housing 420, and housing 430. The housing 410 is shown to the comprised of three contact pins 401a-c. This depicts a typical SAE J1772 plug that supplies power to a vehicle. Housing 420 is shown to be comprised of three contact pins 401a-c that supply power to the vehicle and two fiber-optic contact pins 403a and 403b that are used for data transfer between a vehicle and a station (e.g., station 204 of FIG. 2). This configuration shows that housing 420 houses both power and data cables. Alternatively, housing 430 shows that it is made up of two housings (e.g., housing 405 and housing 411). In this example housing 430, housing 405 comprises three contact pins 401a-c that are used to supply power to the vehicle. Further, housing 411 is shown to comprise two fiber-optic contact pins 403a and 403b.

It should be understood that although the first set of contact pins is shown to be comprised of three contact pins 401a-c associated with supplying power to the vehicle, any number of contact pins may be used to form the contact pins associated with supplying power to the vehicle depending on the implementation. Similarly, although contact pins 403a and 403b are shown to comprise two fiber-optic cables, any number of contact pins may be used to form contact pins associated with data transfer depending on the implementation. Further, it should be understood that although housing 411 is shown to be below housing 405 and shown to be rectangular, it should be understood that housing 411 may be located at any side of the housing 405 or even maybe detached from housing 405. Further, housing 411 may take the form of an oval, circular, square, rectangle, or any other shape in order to house the contact pins 403a and 403b.

It is understood that the above descriptions are for purposes of illustration and are not meant to be limiting.

Figure 5:
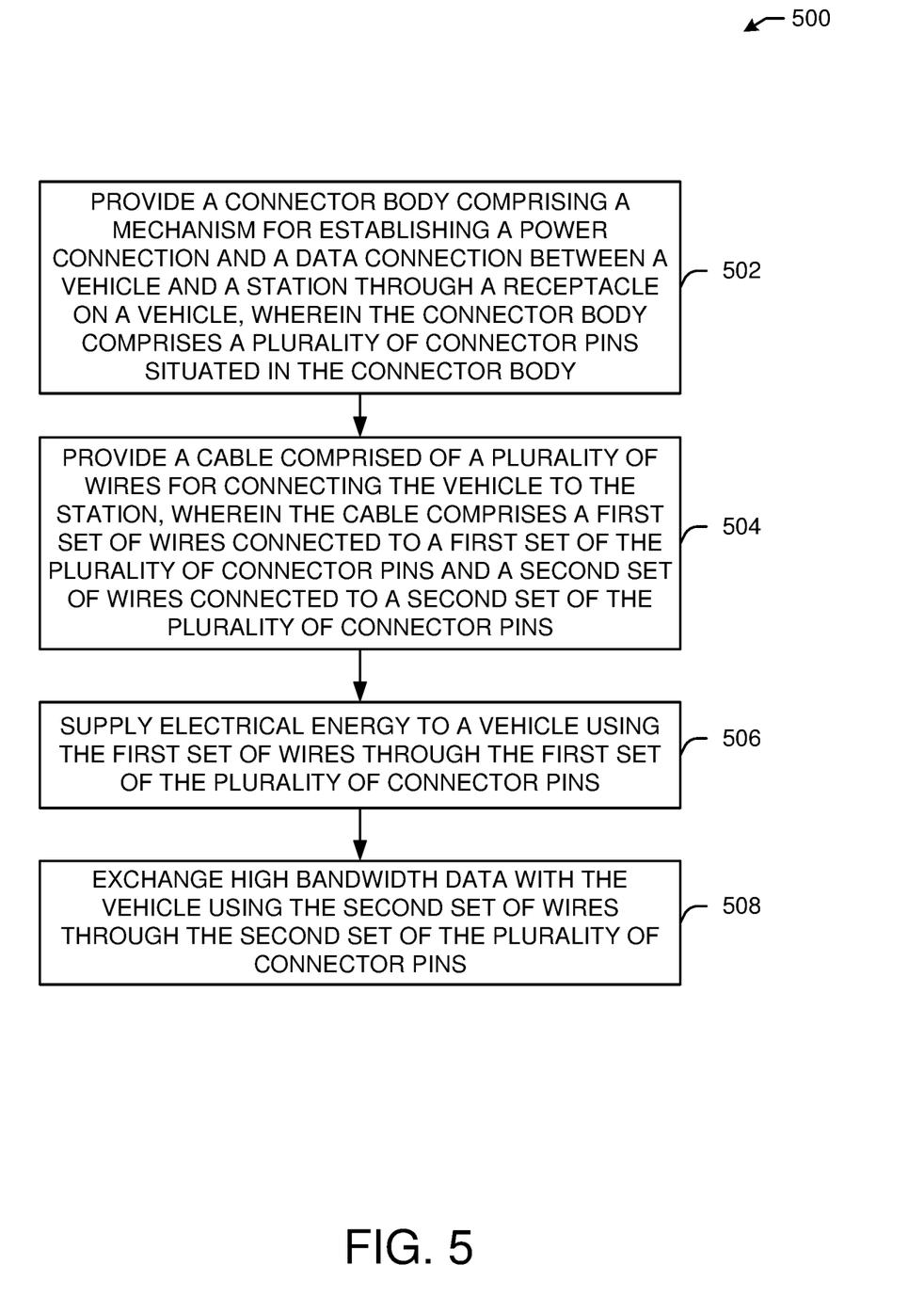
FIG. 5 illustrates a flow diagram of a process for an enhanced vehicle connection system, in accordance with one or more example embodiments of the present disclosure.

FIG. 5 illustrates a flow diagram of process 500 for an illustrative enhanced vehicle connection system, in accordance with one or more example embodiments of the present disclosure.

At block 502, a device may provide a connector body comprising a mechanism for establishing a power connection and a data connection between a vehicle and a station through a receptacle on a vehicle, wherein the connector body comprises a plurality of connector pins situated in the connector body. The plurality of connector pins are configured to simultaneously supply the vehicle with the electrical energy and the high bandwidth data exchange. The plurality of connector pins are configured to connect to respective pins on a receptacle of the vehicle.

At block 504, the device may provide a cable comprised of a plurality of wires for connecting the vehicle to the station, wherein the cable comprises a first set of wires connected to a first set of the plurality of connector pins and a second set of wires connected to a second set of the plurality of connector pins. The connector body is comprised of a first housing and a second housing, wherein the first housing houses the first set of the plurality of connector pins, and wherein the second housing houses the second set of the plurality of connector pins. The connector body houses both the first set of the plurality of connector pins and the second set of the plurality of connector pins. The first set of wires supply alternating current (AC). The second set of wires are fiber-optic cables.

At block 506, the device may supply electrical energy to the vehicle through the power connection using the first set of wires through the first set of the plurality of connector pins.

At block 508, the device may exchange high bandwidth data with the vehicle through the data connection using the second set of wires through the second set of the plurality of connector pins. The high bandwidth data exchange has a data rate of least 10 gigabits per second. It is understood that the above descriptions are for purposes of illustration and are not meant to be limiting.

Figure 6:
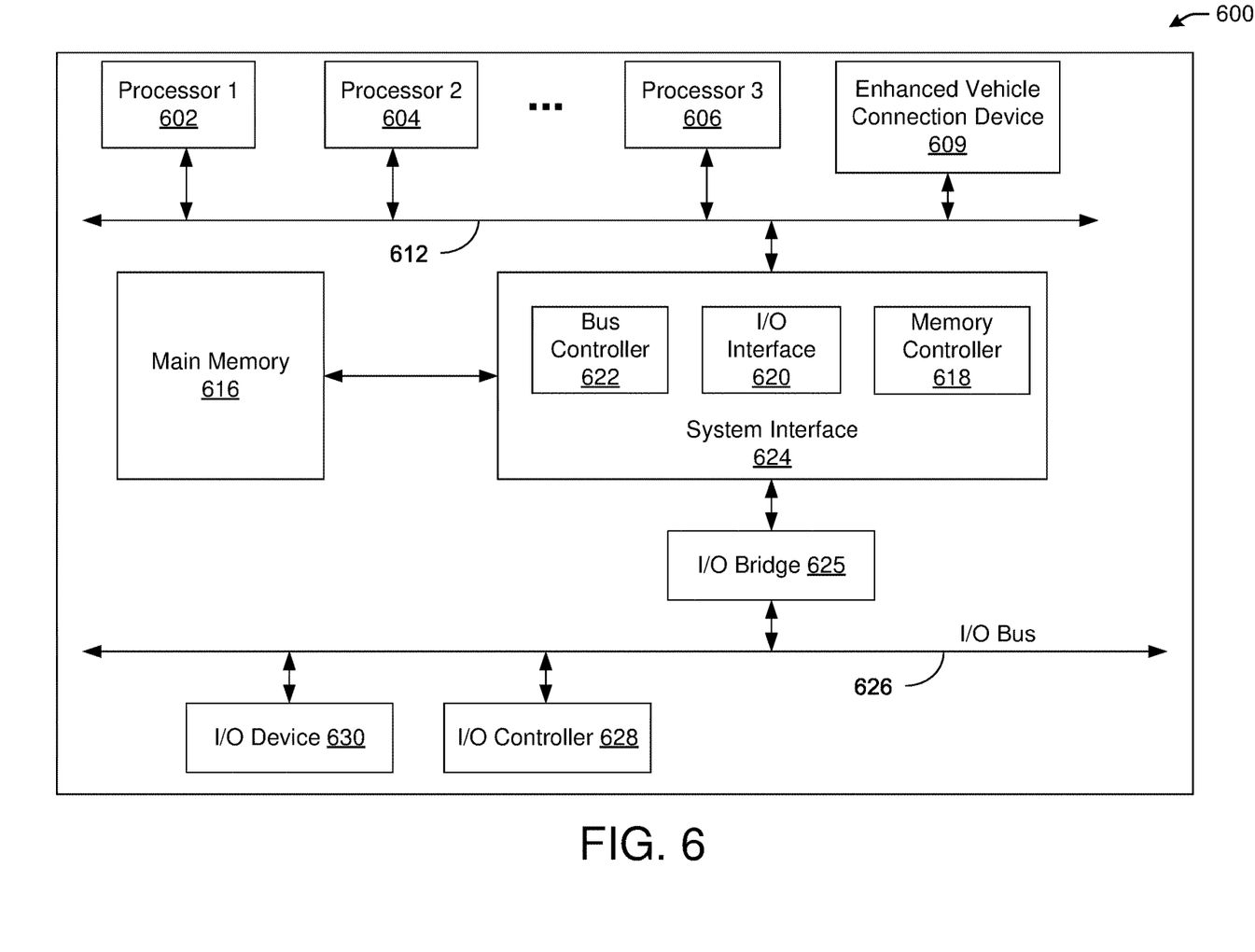
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent the one or more processor(s) 132 and/or the computing system 205 of FIG. 2. The computer system (system) includes one or more processor(s) 602-606. Processor(s) 602-606 may include one or more internal levels of cache (not shown) and a bus controller (e.g., bus controller 622) or bus interface (e.g., I/O interface 620) unit to direct interaction with the processor bus 612. An enhanced vehicle connection device 609 may also be in communication with the processor(s) 602-606, and may be connected to the processor bus 612.

Processor bus 612, also known as the host bus or the front side bus, may be used to couple the processor(s) 602-606 and/or the enhanced vehicle connection device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processor(s) 602-606 and/or the enhanced vehicle connection device 609. Another type of user input device includes cursor control, such as a mouse, a trackball, or cursor direction keys for communicating direction information and command selections to the processor(s) 602-606 and/or the enhanced vehicle connection device 609 and for controlling cursor movement on the display device.

System 600 may include a dynamic storage device, referred to as main memory 616, or a random access memory (RAM), or other computer-readable devices coupled to the processor bus 612 for storing information and instructions to be executed by the processor(s) 602-606 and/or the enhanced vehicle connection device 609. Main memory 616 also may be used for storing temporary variables or other intermediate information during execution of instructions by the processor(s) 602-606 and/or the enhanced vehicle connection device 609. System 600 may include read-only memory (ROM) and/or other static storage device coupled to the processor bus 612 for storing static information and instructions for the processor(s) 602-606 and/or the enhanced vehicle connection device 609. The system outlined in FIG. 6 is but one possible example of a computer system that may employ or be configured in accordance with aspects of the present disclosure.

The processor(s) 602-606 and/or the enhanced vehicle connection device 609 may facilitate integrating a fiber optic link with one or more power connectors. An enhanced vehicle connection system may facilitate that a computing system may continue to operate by the delivery of electricity by the one or more power connectors while on-loading and/or offloading data to and from the vehicle at a high rate of speed. Using a fiber-optic link is scalable and allows for higher data bandwidths and rates. The higher bandwidth may depend on what a vehicle and its computing platform support in addition to what the other endpoint on the transfer station supports.

The processor(s) 602-606 and/or the enhanced vehicle connection device 609 may facilitate an operator to initiate a data transfer without the need to idle the vehicle. The SAE plug is strictly used for charging a vehicle from an external power delivery system. This may occur when the vehicle is stationary.

The processor(s) 602-606 and/or the enhanced vehicle connection device 609 may facilitate the use of a new interface capable of interface with a power plug and a fiber optic data plug to allow a simultaneous transfer of power and data with the vehicle.

The processor(s) 602-606 and/or the enhanced vehicle connection device 609 may facilitate the use of an SAE compatible plug that may have a circular form that may comprise three or more power contact pins. The three or more power contact pins may deliver electrical power to the vehicle in order to charge the batteries of the vehicle and operate its computing system. The three or more power contact pins may connect to an enhanced vehicle interface of the vehicle. The enhanced vehicle interface allows creating contact points between the one or more power contact pins and the power system of the vehicle in order to initiate a transfer of charging electricity to the vehicle systems and to the batteries of the vehicle.

The processor(s) 602-606 and/or the enhanced vehicle connection device 609 may facilitate the use of one or more optical links within the enhanced vehicle connector. The one or more optical links may be comprised of one or more data contact pins. The one or more optical links may connect to the enhanced vehicle interface. The enhanced vehicle interface may allow creating contact points between the one or more data contact pins and the data portion of the vehicle in order to initiate the data transfer to and from the vehicle's computing system without the need to idle the vehicle since the one or more power contact pins may be delivering power to the vehicle systems.

The processor(s) 602-606 and/or the enhanced vehicle connection device 609 may facilitate the use of collocated one or more data pins and one or more power contact pins with the same housing. In that manner, a smaller footprint may be used by the enhanced vehicle plug and the vehicle connector portion of the enhanced vehicle interface.

The processor(s) 602-606 and/or the enhanced vehicle connection device 609 may facilitate the use of two housings to accommodate the one or more data pins and the one or more power contact pins. In that case, the vehicle connector portion would be configured accepting the two housings simultaneously to interface with the enhanced vehicle interface in order to deliver both data and power to and from the vehicle.

Figure 7:
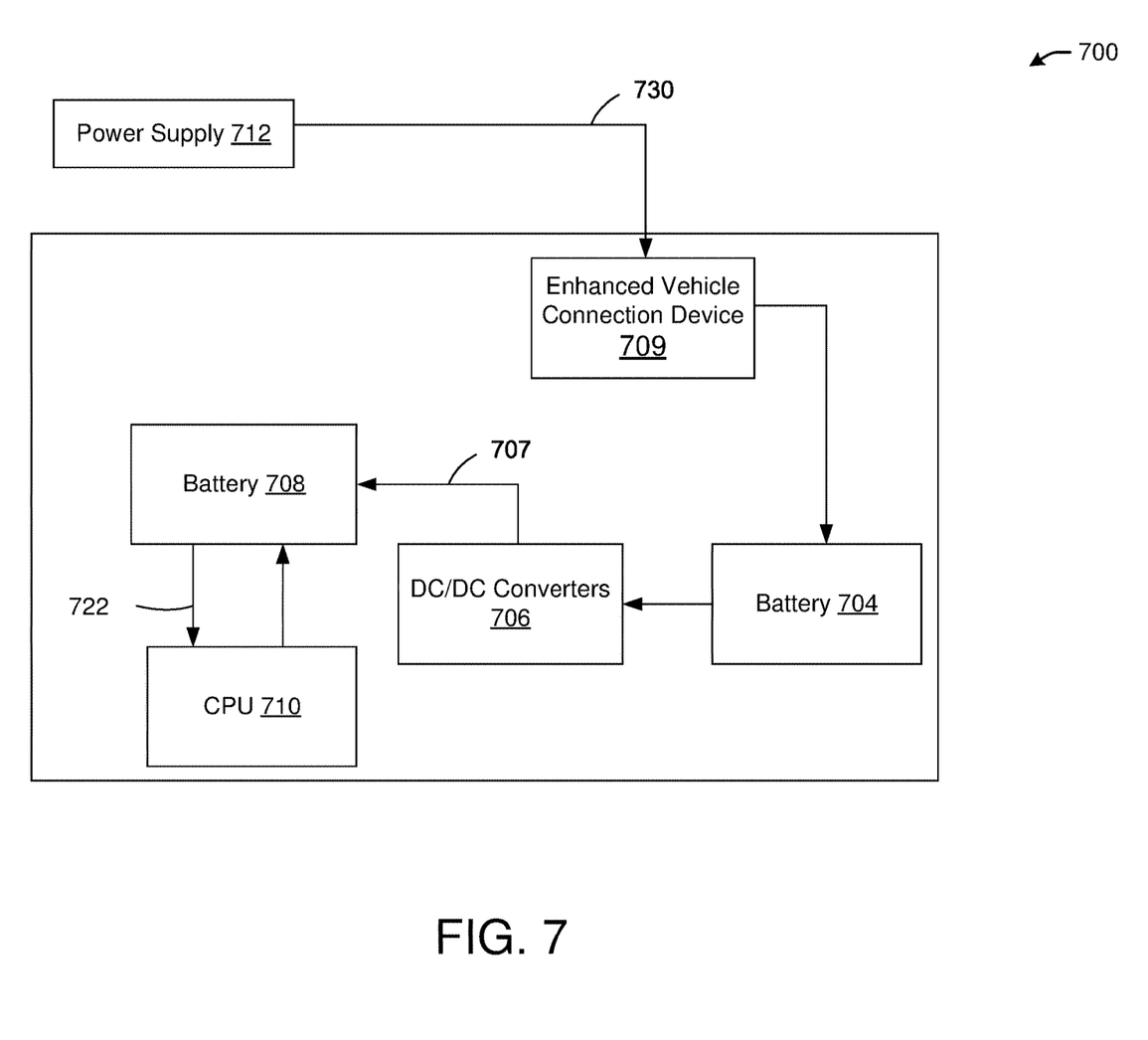
FIG. 7 is a block diagram illustrating an example of a computing device or computer system upon which any of one or more techniques (e.g., methods) may be performed, in accordance with one or more example embodiments of the present disclosure.

FIG. 7 is a block diagram illustrating an example of a computing device or computer system 700 upon which any of one or more techniques (e.g., methods) may be performed, in accordance with one or more example embodiments of the present disclosure.

Referring to FIG. 7, there is shown a power system 700 (e.g., power system 203 of FIG. 2) of a battery-hybrid vehicle or an electric vehicle (e.g., vehicle 102 of FIG. 1), which may include a high voltage battery 704 that powers the vehicle 102 with electric power, one or more DC/DC converters 706 for converting the electric power to a lower voltage power 707 that charges a lower voltage battery 708 (e.g., a 12 volt battery) used to power a computer (CPU) 710 of the vehicle 102. The vehicle 102 may be connected to an external power supply 712 (e.g., a vehicle charging station), which may provide power 730 to charge the battery 708 of the vehicle 102. The power 730 may be managed by an enhanced vehicle connection device 709. The battery 708 may output power to the CPU 710 via a voltage output 722.

The enhanced vehicle connection device 709 may facilitate integrating a fiber optic link with one or more power connectors. An enhanced vehicle connection system may facilitate that a computing system may continue to operate by the delivery of electricity by the one or more power connectors while on-loading and/or offloading data to and from the vehicle at a high rate of speed. Using a fiber-optic link is scalable and allows for higher data bandwidths and rates. The higher bandwidth may depend on what a vehicle and its computing platform support in addition to what the other endpoint on the transfer station supports.

The enhanced vehicle connection device 709 may facilitate the use of a new interface capable of interface with a power plug and a fiber optic data plug to allow a simultaneous transfer of power and data with the vehicle.

The enhanced vehicle connection device 709 may facilitate the use of an SAE compatible plug that may have a circular form that may comprise three or more power contact pins. The three or more power contact pins may deliver electrical power to the vehicle in order to charge the batteries of the vehicle and operate its computing system. The three or more power contact pins may connect to an enhanced vehicle interface of the vehicle. The enhanced vehicle interface allows creating contact points between the one or more power contact pins and the power system of the vehicle in order to initiate a transfer of charging electricity to the vehicle systems and to the batteries of the vehicle.

The enhanced vehicle connection device 709 may facilitate the use of one or more optical links within the enhanced vehicle connector. The one or more optical links may be comprised of one or more data contact pins. The one or more optical links may connect to the enhanced vehicle interface. The enhanced vehicle interface may allow creating contact points between the one or more data contact pins and the data portion of the vehicle in order to initiate the data transfer to and from the vehicle's computing system without the need to idle the vehicle since the one or more power contact pins may be delivering power to the vehicle systems.

The enhanced vehicle connection device 709 may facilitate the use of collocated one or more data pins and one or more power contact pins with the same housing. In that manner, a smaller footprint may be used by the enhanced vehicle plug and the vehicle connector portion of the enhanced vehicle interface.

The enhanced vehicle connection device 709 may facilitate the use of two housings to accommodate the one or more data pins and the one or more power contact pins. In that case, the vehicle connector portion would be configured accepting the two housings simultaneously to interface with the enhanced vehicle interface in order to deliver both data and power to and from the vehicle.

It is understood that the above descriptions are for purposes of illustration and are not meant to be limiting.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processor(s) 602-606 and/or the enhanced vehicle connection device 609 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A vehicle connection apparatus comprising:
a connector body configured to establish a power connection and a data connection between a vehicle and a station through the connector body to a receptacle on a vehicle, wherein the connector body includes a plurality of connector pins situated in the connector body, each pin of the plurality of connector pins having a cylindrical shape having a diameter and a height, the height of each pin of the plurality of connector pins extending in a same direction;
a first set of wires connected to a first set of the plurality of connector pins, wherein the first set of wires are configured to supply electrical energy to a vehicle through the first set of the plurality of connector pins; and
a second set of wires connected to a second set of the plurality of connector pins, wherein the second set of wires are configured to perform high bandwidth data exchange with the vehicle through the second set of the plurality of connector pins.

2. The vehicle connection apparatus of claim 1, wherein the plurality of connector pins are configured to simultaneously supply the vehicle with the electrical energy and the high bandwidth data exchange.

3. The vehicle connection apparatus of claim 1, wherein the connector body is comprised of a first housing and a second housing,
wherein the first housing houses the first set of the plurality of connector pins, and
wherein the second housing houses the second set of the plurality of connector pins.

4. The vehicle connection apparatus of claim 1, wherein the connector body houses both the first set of the plurality of connector pins and the second set of the plurality of connector pins.

5. The vehicle connection apparatus of claim 1, wherein the second set of wires are fiber-optic cables.

6. The vehicle connection apparatus of claim 1, wherein the high bandwidth data exchange has a data rate of least 10 gigabits per second.

7. The vehicle connection apparatus of claim 1, wherein the first set of wires supply alternating current (AC).

8. The vehicle connection apparatus of claim 1, wherein the plurality of connector pins are configured to connect to respective pins on a receptacle of the vehicle.

9. An vehicle connection system comprising:
a connector body comprising a mechanism for attaching the connector body to a receptacle on a vehicle;
wherein the connector body comprises a plurality of connector pins situated in the connector body, each pin of the plurality of connector pins having a cylindrical shape having a diameter and a height, the height of each pin of the plurality of connector pins extending in a same direction; and
a cable comprised of a plurality of wires for connecting the vehicle to a station,
wherein the cable comprises a first set of wires connected to a first set of the plurality of connector pins,
wherein the first set of wires is configured to supply electrical energy to a vehicle through the first set of the plurality of connector pins, and a second set of wires connected to a second set of the plurality of connector pins,
wherein the second set of wires are configured to perform high bandwidth data exchange with the vehicle through the second set of the plurality of connector pins.

10. The vehicle connection system of claim 9, wherein the enhanced vehicle connector system is configured to simultaneously supply the vehicle with the electrical energy and the high bandwidth data exchange.

11. The vehicle connection system of claim 9, wherein the connector body is comprised of a first housing and a second housing,
wherein the first housing houses the first set of the plurality of connector pins, and
wherein the second housing houses the second set of the plurality of connector pins.

12. The vehicle connection system of claim 9, wherein the connector body houses both the first set of the plurality of connector pins and the second set of the plurality of connector pins.

13. The vehicle connection system of claim 9, wherein the second set of wires comprise fiber-optic cables.

14. The vehicle connection system of claim 9, wherein the high bandwidth data exchange has a data rate of least 10 gigabits per second.

15. The vehicle connection system of claim 9, wherein the first set of wires supply alternating current (AC).

16. The vehicle connection system of claim 9, wherein the plurality of connector pins are configured to connect to respective pins on a receptacle of the vehicle.

17. A connection station comprising:
a first connection portion configured to establish a power connection between a vehicle through a connector body of a connection plug to a receptacle on a vehicle, wherein the connector body includes a plurality of connector pins situated in the connector body of the connection plug, each pin of the plurality of connector pins having a cylindrical shape having a diameter and a height, the height of each pin of the plurality of connector pins extending in a same direction;

a second connection portion configured to establish a data connection between the vehicle through the connector body of the connection plug to the receptacle on the vehicle;

a first set of wires connected to a first set of the plurality of connector pins, wherein the first set of wires are configured to supply electrical energy to a vehicle through the first set of the plurality of connector pins; and a second set of wires connected to a second set of the plurality of connector pins, wherein the second set of wires are configured to perform high bandwidth data exchange with the vehicle through the second set of the plurality of connector pins.

18. The connection station of claim 17, wherein
the plurality of connector pins are configured to simultaneously supply the vehicle with the electrical energy and the high bandwidth data exchange.

19. The connection station of claim 17, wherein
the connector body is comprised of a first housing and a second housing,
wherein the first housing houses the first set of the plurality of connector pins, and
wherein the second housing houses the second set of the plurality of connector pins.

20. The connection station of claim 17, wherein
the connector body houses both the first set of the plurality of connector pins and the second set of the plurality of connector pins.

* * * * *